US005487635A

United States Patent [19]
Hellkuhl et al.

[11] Patent Number: 5,487,635
[45] Date of Patent: Jan. 30, 1996

[54] SLIDE-IN STORE FOR ROLLER PALLETS AND A PROCESS FOR INSERTING GOODS INTO AND WITHDRAWING GOODS OUT OF SAID STORE

[75] Inventors: Ludger Hellkuhl; Siegfried Mörs; Günter Pelzer; Friedhelm Wesselmann, all of Gütersloh, Germany

[73] Assignee: Miele & Cie. GmbH & Co., Guetersloh, Germany

[21] Appl. No.: 216,087

[22] Filed: Mar. 21, 1994

Related U.S. Application Data

[63] Continuation-in-part of Ser. No. 752,658, Aug. 21, 1991, abandoned.

[30] Foreign Application Priority Data

Mar. 7, 1989 [DE] Germany .............. 39 07 264.9

[51] Int. Cl.[6] .................................................. B65G 1/04
[52] U.S. Cl. ..................... 414/277; 414/234; 414/264
[58] Field of Search .......................... 414/277, 278, 414/233, 234, 264, 390, 391, 392, 393, 395, 396

[56] References Cited

U.S. PATENT DOCUMENTS

| | | | |
|---|---|---|---|
| 1,605,220 | 11/1926 | Cuvillier et al. | 414/234 |
| 3,792,785 | 2/1974 | Weir | 414/278 |
| 3,896,941 | 7/1975 | Kuhn et al. | 414/277 |
| 4,307,985 | 12/1981 | Desprez et al. | 414/234 X |
| 4,466,765 | 8/1984 | Mautino | 414/277 |

FOREIGN PATENT DOCUMENTS

| | | |
|---|---|---|
| 126431 | 11/1984 | European Pat. Off. . |
| 1906282 | 9/1970 | Germany . |
| 2350615 | 6/1974 | Germany . |
| 3038474 | 5/1982 | Germany . |

OTHER PUBLICATIONS

German Article—"Permanente Bewegung" from Hightech Jul. 1989 publication, one page (p. 85).
German article—from "Fordern und Leben", 1974 pp. 715, 716, 719 and 720.

Primary Examiner—Margaret A. Focarino
Assistant Examiner—Stephen Gordon
Attorney, Agent, or Firm—Collard & Roe

[57] ABSTRACT

The warehouse has a high storage density and is suitable for the storage of bulk goods. The warehouse has at least three superimposed storage areas. A storage area is laid out as the operational level for the storage and withdrawal of the goods. A further storage area consists of a storage level with one or more superimposed storage levels for storing and consigning goods. A further storage area is used as an auxiliary operational level for preparing roller pallets and taking them to the operational level.

11 Claims, 6 Drawing Sheets

SLIDE-IN STORE FOR ROLLER PALLETS AND A PROCESS FOR INSERTING GOODS INTO AND WITHDRAWING GOODS OUT OF SAID STORE

This is a continuation-in-part of application Ser. No. 07/752,658 filed on Aug. 21, 1991 and now abandoned. International Application PCT/DE90/00150 filed on Mar. 2, 1990 and which designated the U.S.

BACKGROUND OF THE INVENTION

1. Field of the Invention

This invention has to do with a slide-in warehouse for roller pallets with one or more superimposed and horizontally positioned storage planes in which each storage plane is connected to at least one transport passage, in which transport vehicles can move, at a right angle with the storage channels positioned at the storage plane, which provide the appropriate devices for the insertion and withdrawal of the roller pallets in the storage channels and the devices respectively position the roller pallets at the beginning of a storage channel and couple them with a roller pallet located in the storage channel and turn around, as well as a process of insertion and withdrawal of goods.

The warehouse should have a high storage density and it should serve for the storage of bulk goods.

2. The Prior Art

For the accomplishment of this purpose, a storage system limited to three levels is already known in which the entire conveyance flow of insertion and withdrawal is handled through the central storage level and, with each conveyance cycle, from the middle storage level outward, the goods are conveyed and exchanged alternately once in the higher and once in the lower storage level. The particular disadvantage here is that the number of the storage areas is limited to three storage levels. If further storage areas are required, then the storage system must be expanded even beyond the existing storage system of three storage levels. In the expanded storage system, then, the middle storage level is also used for the conveyance flow of insertion and withdrawal. Furthermore, with this type of storage additional surfaces are required for the preparation and consignment of the goods.

SUMMARY OF THE INVENTION

An object of the invention is to create a warehouse with the least possible ground space in which a greater number of storage areas are available and, furthermore, where it is possible to have sorting which is automatic and specific as to place for more of the storage and shipping operations within the warehouse according to the loading lists issued. The advantage which is achieved by the invention is constituted particularly in the fact that, in a relatively minimal ground surface area of the warehouse, the storage, consignment and preparation of goods according to the shipping orders or the loading lists can be executed, so that precise sorting is made possible with the parallel execution of more operations.

BRIEF DESCRIPTION OF THE DRAWINGS

An example of the application of the invention is represented in the drawing, and is described in more detail in the following. This displays.

DETAILED DESCRIPTION OF THE PREFERRED EMBODIMENTS

Figure 1:
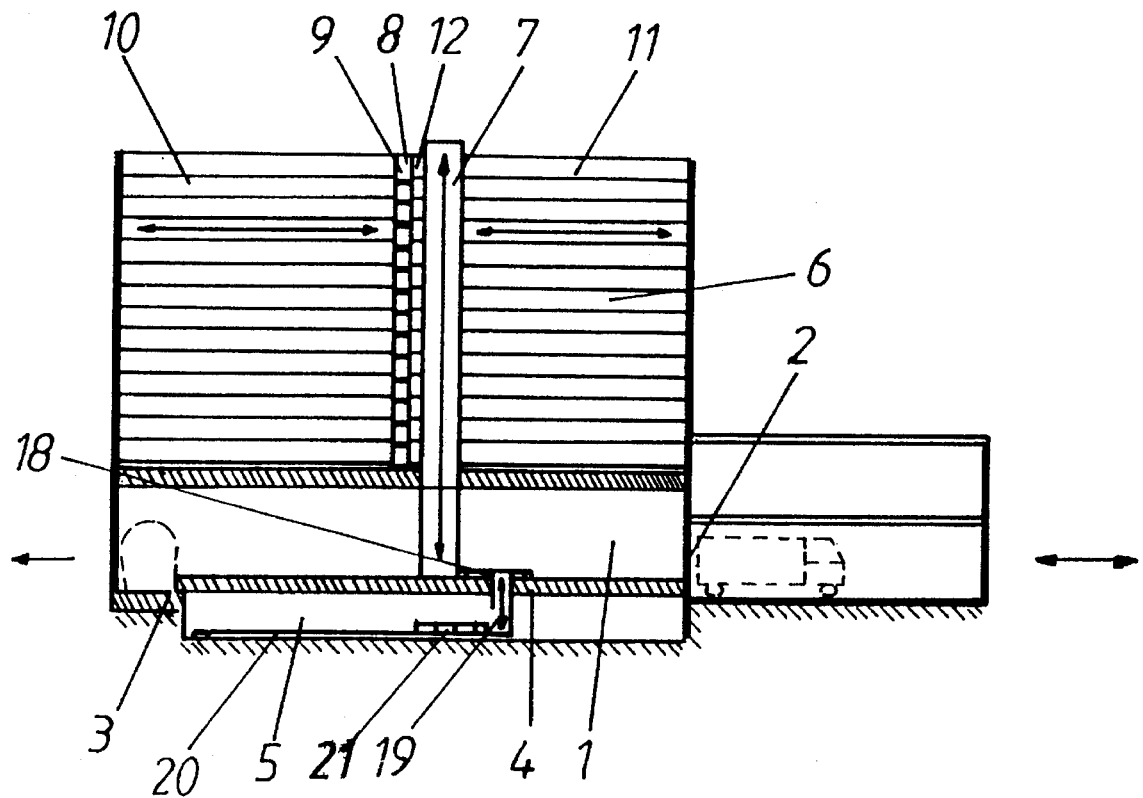
FIG. 1 a slide-in warehouse in side view, in cross section.
Figure 2:
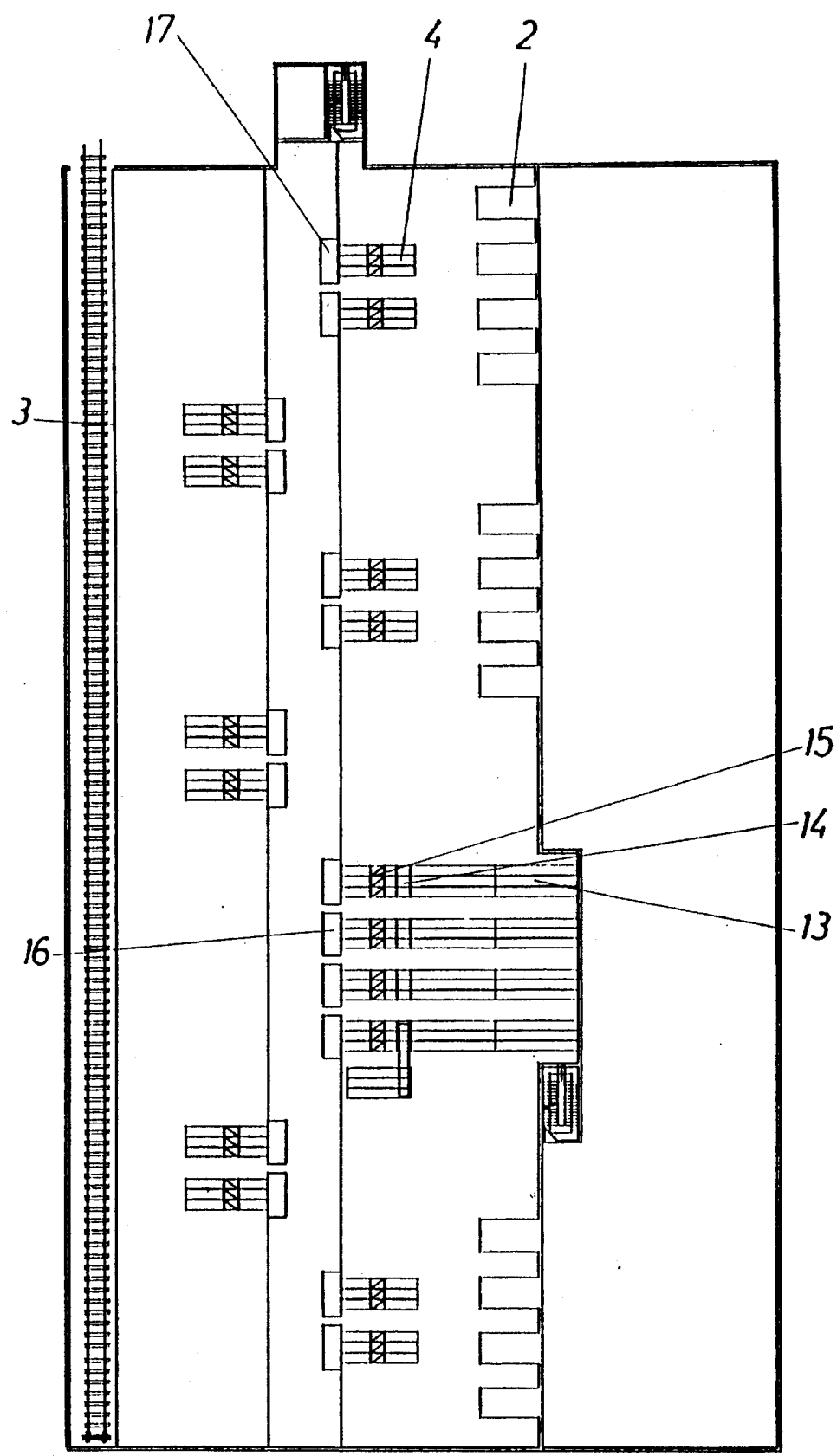
FIG. 2 the operational plane, viewed from above.
Figure 3:
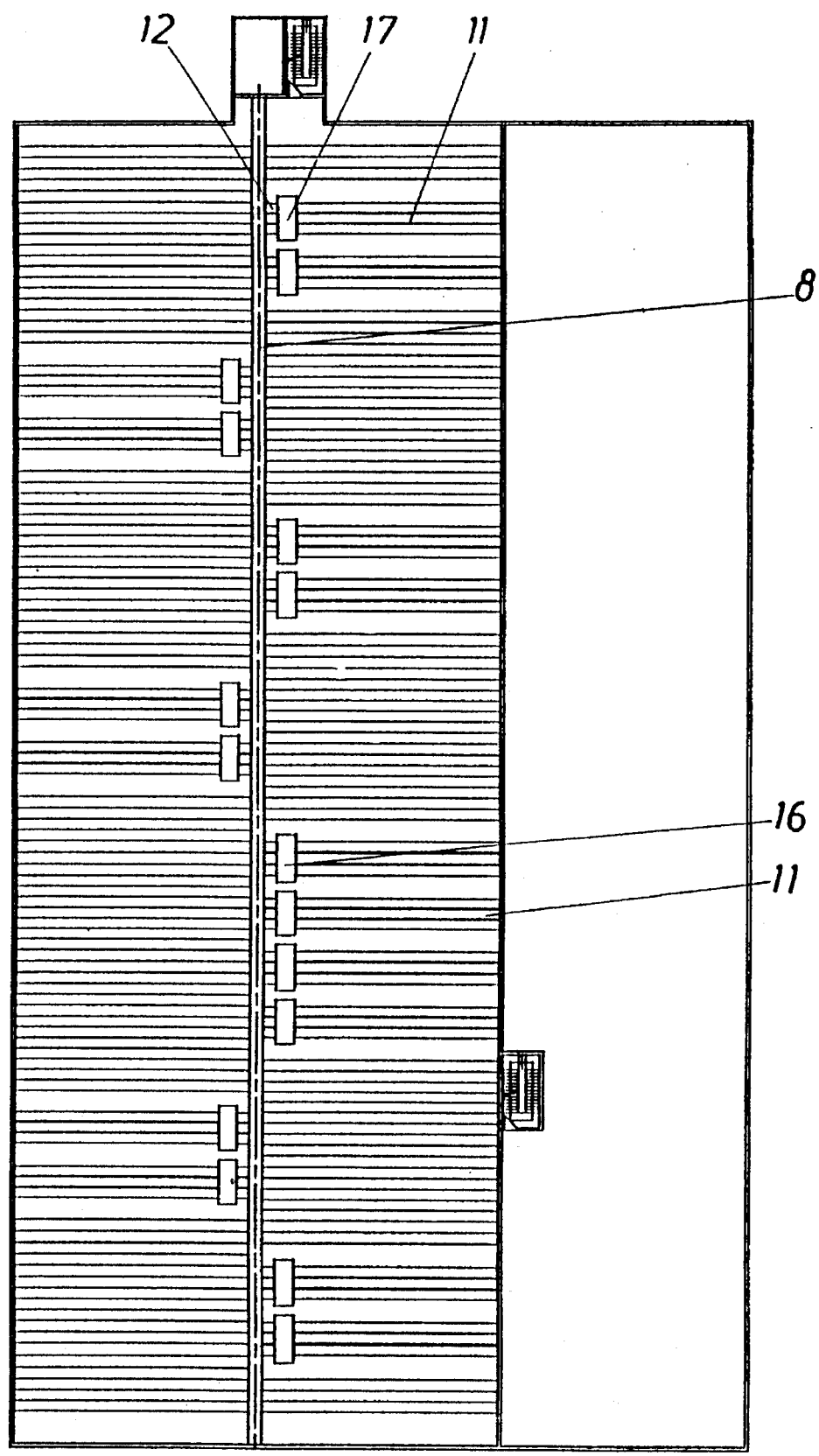
FIG. 3 a storage plane, viewed from above.
Figure 4:
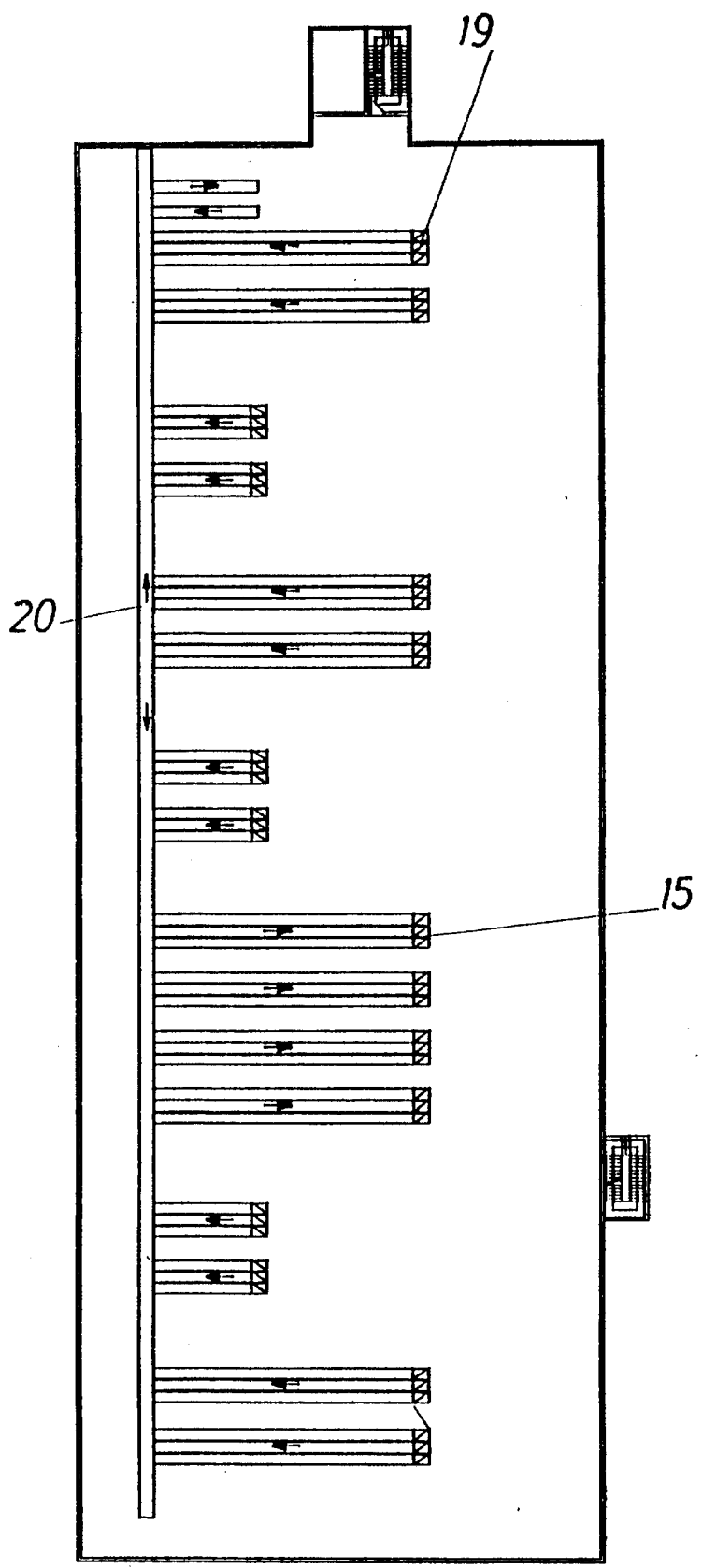
FIG. 4 the auxiliary operational plane, viewed from above.

In FIG. 1, there is the insertion and withdrawal of the goods on the operational plane of a slide-in warehouse.

The operational level or plane (1) has cargo vehicle ramps (2) for the receipt and dispatch of the goods (22) by cargo vehicle as well as ramps for the dispatch of the goods by rail (3). The ramps are positioned at the respective loading stations (4).

Underneath the operational level or plane (1) the auxiliary operational level or plane (5) is positioned in the basement. On this plane, the empty roller pallets (21) are stored and again brought to the operational plane (1) on the appropriate devices. Above the operational plane (1) the storage level or planes (6) are positioned. The storage planes (6) are connected to each other and to the operational plane (1) by means of elevators or hoists (7). Each storage plane has a transport passage (8) in which a transport vehicle (9) can travel. At a right angle to this transport passage (8) are positioned the loading channels (10) as well as the storage lanes (11). At the transport passage (8) and the hoist (7) a handling area (12) is positioned in each storage plane (6) so that no additional means of transport is required between the hoist (7) and the transport vehicle (9). The storage lanes (11) are positioned to the rear of the hoists (7).

In the following, the process for the insertion and the withdrawal of the goods is described in more detail.

The delivery of the goods takes place by means of the cargo vehicle on a cargo vehicle ramp (2) with any suitable known devices (13) for the rapid unloading and any suitable known devices (14) for the rapid unstacking of the goods, which devices are not indicated in further detail. In the next work step, the goods are placed on roller pallets at a handling station (15) and are prepared for their further transport in the storage planes (6). For this, the roller pallets are brought directly to the handling station (15) over the auxiliary operational plane (5) on a transport device (19). Here, in one work step, a maximum of three large packed household appliances, etc., can be placed on roller pallets. This unit of goods for storage is brought to a loading hoist (16) for subsequent transport in the storage lanes (6). The insertion of the goods takes place only by means of this loading hoist (16). The loading hoist (16) carries the unit of goods for storage to a storage plane (6) as established by the storage management and places the unit of goods in the handling area (12) of the storage plane (6) positioned at the loading hoist (16). The transport vehicle (9) of the respective transport passage (8) takes on the unit of goods for subsequent transport in the loading or storage channels (10). If the chosen handling area (12) is already full, then the unit of goods can also be transported in the storage lane (11) positioned at the loading hoist (16) and stored there temporarily until a later point in time for transport in the storage channels.

Inside of the loading or storage channels (10) and storage lanes (11) it is not required that there be any auxiliary means of transport for the goods. The roller pallets are interconnected by means of known coupling mechanisms and are coupled and uncoupled with each other in the insertion and withdrawal out of a loading or storage channel (10) or a storage lane (11).

Figure 5:
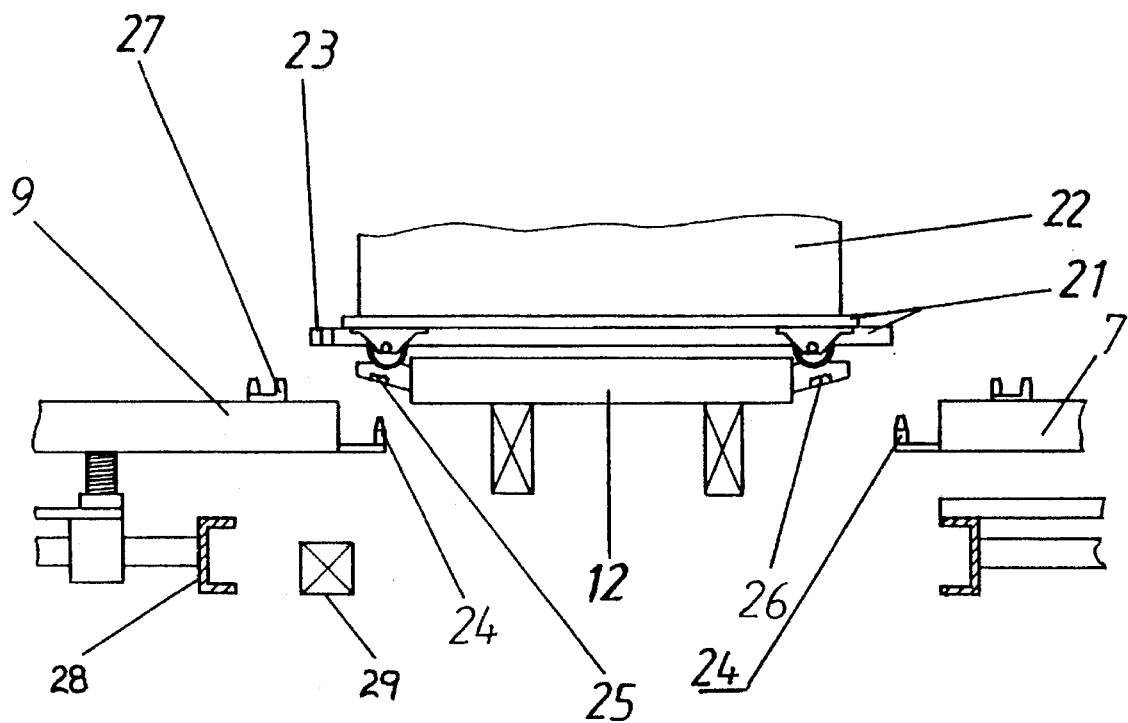
FIG. 5 shows a roller pallet carrying goods.
Figure 6:
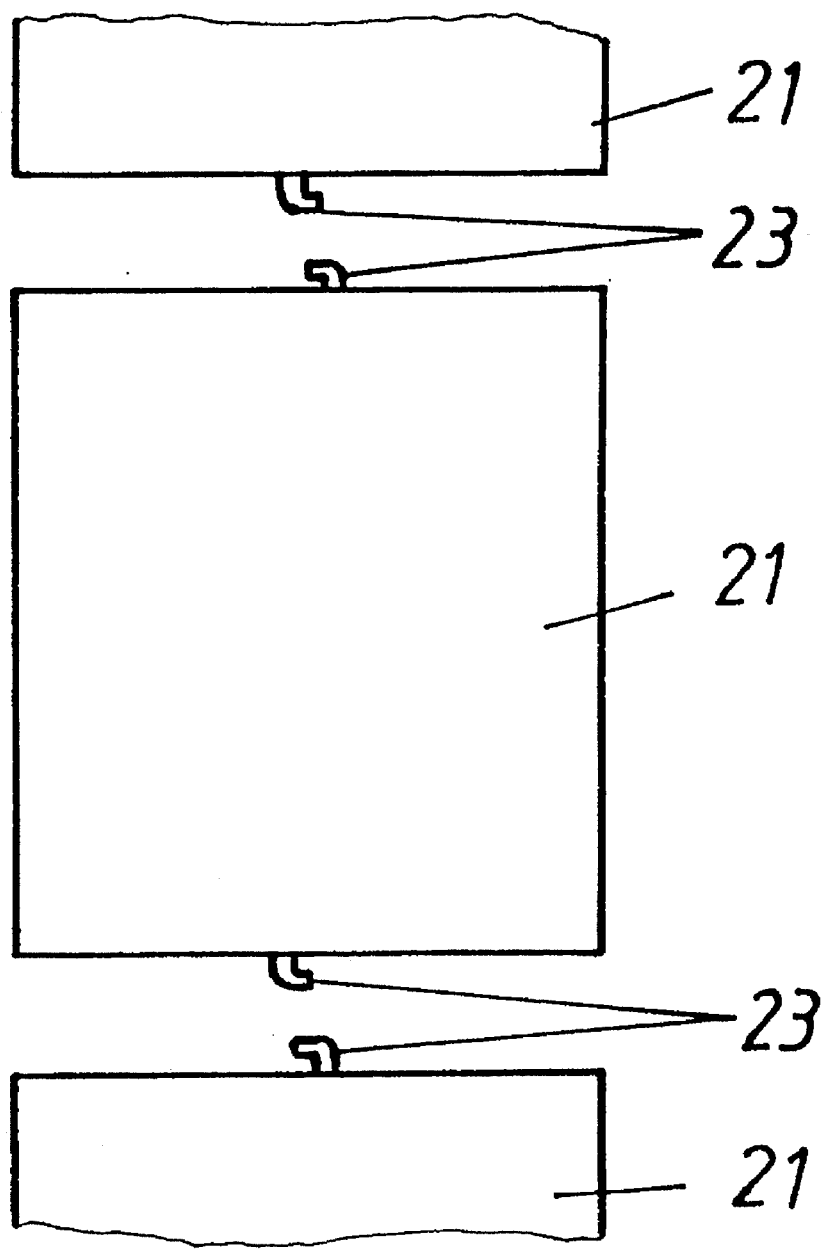
FIG. 6 shows coupling means for the roller pallets.

FIGS. 5 and 6 illustrate the roller pallet
wherein 9 denotes horizontal transport vehicles;
wherein 12 denotes handling areas;
wherein 7 denotes hoist;
wherein 27 denotes devices for insertion and withdrawal;
wherein 23 denotes coupling devices on the roller pallets;
wherein 28 denotes supporting beam for hoist 7;
wherein 29 denotes chassis of the transport vehicle;
wherein 24 denotes devices for docking in the handling areas 12;
wherein 25 denotes means for docking to the horizontal transport vehicles 9; and
wherein 26 denotes means for docking to the hoist 7.

The above elements are briefly explained as follows:

With regard to 27, the driver drives beneath the pallet and can then engage the coupling device 23 of the pallet. Means 24 for docking on the handling area are needed when the roller pallet is transferred from the hoist or horizontal transport vehicle to the handling area. Means 25 for docking on the horizontal transport vehicle receive means 24 from the handling area. Means 26 for docking on the hoist receive 24 from the handling area.

Devices which may be utilized for rapidly loading or unloading and stacking or unstacking of the roller pallet are fork-lifts. The fork-lifts can also be used to couple and uncouple the roller pallets. The roller pallets can be transported inside the auxiliary storage level by fork-lifts. The roller pallets can be brought to the operational plane from the auxiliary level by transport device 19. Fork-lifts can also be used for insertion and withdrawal of the roller pallets.

The withdrawal of the goods takes place by means of the so-called sorting hoist (17). From the handling areas (12), pursuant to the delivery order of a readied cargo vehicle, various large household appliances are assembled into a delivery unit. In order for this, the transport vehicle (9) of the transport passages (8) carries the respective household appliance out of the loading or storage channels (10) to the handling areas (12) of a designated sorting hoist (17) which is positioned at the cargo vehicle ramp (2) utilized. The sorting hoist (17) is sent to it with the goods in a chosen storage lane (11) positioned at the rear of the storage plane (6) which represents a consignment zone. In this way, the various types of appliances can be stored temporarily in the same order as that of their subsequent delivery to the shipping destination. By this means, for example, it is possible to have a loading for the circular delivery tour called for in shipping.

As soon as the cargo vehicle is standing available at the ramp (2) the sorting function of the respective hoist (17) is halted and the hoist (17) is made available only for the withdrawal of the goods. In this, the roller pallets with the appliances are transferred on an unloading station (18), the appliances are separated from the roller pallets and, for example, with the assistance of fork-lifts, etc., are loaded into the cargo vehicle or for shipment by rail in cars. The empty roller pallets are carried on a transport device (19) into the auxiliary operational plane (5) and then on to the handling station (15) in the operational plane (1) to be made available. The transport of the empty roller pallets inside of the auxiliary operational plane (5) is effected by means of a transport system (20) between the transport devices (19), which system is not described in further detail.

We claim:

1. A slide-in warehouse for roller pallets comprising:
at least three superimposed and horizontally positioned storage levels;
each storage level having a loading channel and being connected to at least one transport passage,
horizontally movable transport vehicles for moving at a right angle with each loading channel, one of said transport vehicles being positioned at each storage level, which transport vehicles comprise means for the horizontal insertion and withdrawal of the roller pallets in the loading channels;
said horizontally movable transport vehicles respectively positioning the roller pallets at the beginning of each loading channel and each transport vehicle having means for coupling a roller pallet to the transport vehicle;
a vertically movable transport vehicle for moving said roller pallets between said at least three storage levels;
wherein said at least three storage levels are located one on top of the other and further comprising:
a first storage level being an operational level for the insertion and withdrawal of goods;
a second storage level for the storage and consignment of the goods; and
a third storage level comprising an auxiliary operational level for the storage, preparation and supplying of the roller pallets into the operational level.

2. A slide-in warehouse for roller pallets in accordance with claim 1,
wherein the warehouse has a ground level and a basement below the ground level; and
wherein the operational level is positioned at the ground level of the warehouse; the auxiliary operational level is positioned in the basement of the warehouse and the storage levels are positioned above the operational level.

3. A slide-in warehouse for roller pallets in accordance with claim 1,
wherein each of said at least three storage levels has at least one storage zone which comprises a respective one of said loading channels and has at least one consignment zone which comprises a storage lane.

4. A slide-in warehouse for roller pallets in accordance with claim 1,
wherein said vertically movable transport vehicle comprises
hoist means for connecting the operational level to the at least three storage levels and for connecting the at least three storage levels to each other.

5. A slide-in warehouse for roller pallets in accordance with claim 4, further comprising
a handling area connected to each of said at least three storage levels as well as to said hoist means and to a respective one of said transport passages.

6. A slide-in warehouse for roller pallets in accordance with claim 4, wherein each of said at least three storage levels further comprise a storage lane; and
wherein said hoist means is operationally connected to each said storage lane.

7. A slide-in warehouse for roller pallets in accordance with claim 4,
wherein said hoist means comprises a loading hoist.

8. A slide-in warehouse for roller pallets in accordance with claim 4,
wherein said hoist means comprises a sorting hoist.

9. A slide-in warehouse for roller pallets in accordance with claim 1, wherein the auxiliary operational level has transport vehicles in order to provide roller pallets to the operational level.

10. A slide-in warehouse for roller pallets in accordance with claim 9, further comprising a transport system;
wherein the auxiliary operational level has said transport system for the interconnection of the auxiliary level transport vehicles.

11. A slide-in warehouse for roller pallets comprising:
at least three superimposed and horizontally positioned storage levels;
each storage level having a loading channel and being connected to at least one transport passage,
horizontally movable transport vehicles for moving at a right angle with each loading channel, one of said transport vehicles being positioned at each storage level, which transport vehicles comprise means for the horizontal insertion and withdrawal of the roller pallets in the loading channels;
said horizontally movable transport vehicles respectively positioning the roller pallets at the beginning of each loading channel and each transport vehicle having means for coupling a roller pallet to the transport vehicle;
wherein said at least three storage levels are located one on top of the other and further comprising:
a first storage level being an operational level for the insertion and withdrawal of goods;
a second storage level for the storage and consignment of the goods;
a third storage level comprising an auxiliary operational level for the storage, preparation and supplying of the roller pallets into the operational level; and
a first vertically movable transport vehicle for moving said roller pallets between said first storage level and said second storage level; and
a second vertically movable transport vehicle for moving said roller pallets between said auxiliary operational level and said first storage level.

* * * * *